United States Patent
Shi et al.

(10) Patent No.: US 10,657,969 B2
(45) Date of Patent: May 19, 2020

(54) IDENTITY VERIFICATION METHOD AND APPARATUS BASED ON VOICEPRINT

(71) Applicant: Fujitsu Limited, Kawasaki-shi, Kanagawa (JP)

(72) Inventors: Ziqiang Shi, Beijing (CN); Liu Liu, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 194 days.

(21) Appl. No.: 15/866,079

(22) Filed: Jan. 9, 2018

(65) Prior Publication Data
US 2018/0197547 A1   Jul. 12, 2018

(30) Foreign Application Priority Data
Jan. 10, 2017   (CN) .......................... 2017 1 0019531

(51) Int. Cl.
| | | |
|---|---|---|
| *G10L 17/18* | (2013.01) | |
| *G06F 17/17* | (2006.01) | |
| *G10L 25/30* | (2013.01) | |
| *G10L 17/06* | (2013.01) | |
| *G10L 17/04* | (2013.01) | |

(52) U.S. Cl.
CPC .............. *G10L 17/18* (2013.01); *G06F 17/17* (2013.01); *G10L 25/30* (2013.01); *G10L 17/04* (2013.01); *G10L 17/06* (2013.01)

(58) Field of Classification Search
None
See application file for complete search history.

(56) References Cited

U.S. PATENT DOCUMENTS

| | | | | |
|---|---|---|---|---|
| 5,671,328 A | * | 9/1997 | Fitzpatrick | G10L 15/063 704/231 |
| 7,206,390 B2 | * | 4/2007 | Smith | H04L 12/64 379/88.04 |
| 8,812,319 B2 | * | 8/2014 | Skerpac | G10L 17/005 704/246 |
| 9,401,148 B2 | * | 7/2016 | Lei | G10L 17/18 |
| 9,858,919 B2 | * | 1/2018 | Saon | G10L 15/063 |

(Continued)

FOREIGN PATENT DOCUMENTS

CN    105513597    4/2016

OTHER PUBLICATIONS

European Search Report in Application No. 18150722.9 dated Jun. 4, 2018 (10 pages).

*Primary Examiner* — Thuykhanh Le
(74) *Attorney, Agent, or Firm* — Staas & Halsey LLP

(57) ABSTRACT

An identity verification method and an identity verification apparatus based on a voiceprint are provided. The identity verification method based on a voiceprint includes: receiving an unknown voice; extracting a voiceprint of the unknown voice using a neural network-based voiceprint extractor which is obtained through pre-training; concatenating the extracted voiceprint with a pre-stored voiceprint to obtain a concatenated voiceprint; and performing judgment on the concatenated voiceprint using a pre-trained classification model, to verify whether the extracted voiceprint and the pre-stored voiceprint are from a same person. With the identity verification method and the identity verification apparatus, a holographic voiceprint of the speaker can be extracted from a short voice segment, such that the verification result is more robust.

19 Claims, 7 Drawing Sheets

(56) References Cited

U.S. PATENT DOCUMENTS

| | | | |
|---|---|---|---|
| 2003/0113002 A1* | 6/2003 | Philomin | G06K 9/00885 382/116 |
| 2005/0049870 A1* | 3/2005 | Zhang | G10L 15/10 704/254 |
| 2007/0239444 A1* | 10/2007 | Ma | G10L 15/20 704/233 |
| 2007/0294083 A1* | 12/2007 | Bellegarda | G10L 17/04 704/250 |
| 2010/0049518 A1* | 2/2010 | Ferrieux | G10L 19/0018 704/254 |
| 2010/0131272 A1* | 5/2010 | Wu | G06F 21/32 704/243 |
| 2010/0223057 A1* | 9/2010 | Capman | G10L 17/02 704/250 |
| 2011/0112830 A1* | 5/2011 | Adibi | G10L 17/02 704/211 |
| 2011/0112838 A1* | 5/2011 | Adibi | G10L 17/02 704/249 |
| 2013/0132091 A1* | 5/2013 | Skerpac | G10L 17/005 704/273 |
| 2013/0339018 A1* | 12/2013 | Scheffer | G10L 17/22 704/236 |
| 2015/0066494 A1* | 3/2015 | Salvador | G06F 3/165 704/224 |
| 2015/0095026 A1* | 4/2015 | Bisani | G10L 15/08 704/232 |
| 2015/0127342 A1* | 5/2015 | Sharifi | G10L 17/005 704/239 |
| 2015/0142446 A1* | 5/2015 | Gopinathan | G06Q 40/025 704/270 |
| 2015/0187359 A1* | 7/2015 | Bhaskaran | G10L 17/24 704/235 |
| 2016/0189706 A1* | 6/2016 | Zopf | G10L 15/063 713/320 |
| 2016/0293167 A1* | 10/2016 | Chen | G10L 17/18 |
| 2017/0103488 A1* | 4/2017 | Schobel | G06Q 10/10 |
| 2018/0068103 A1* | 3/2018 | Pitkanen | H04L 63/0861 |
| 2018/0293990 A1* | 10/2018 | Li | G10L 17/22 |

* cited by examiner

IDENTITY VERIFICATION METHOD AND APPARATUS BASED ON VOICEPRINT

CROSS-REFERENCE TO RELATED APPLICATIONS

This application claims the benefit of Chinese Application No. 201710019531.9, filed on Jan. 10, 2017, in the Chinese Intellectual Property Office, the disclosure of which is incorporated herein by reference.

BACKGROUND

1. Field

The disclosure relates to the technical field of voice processing, and in particular to an identity verification method and an identity verification apparatus based on a voiceprint.

2. Description of the Related Art

Voiceprints are widely used in various fields such as user interfaces, homeland security and telephone banking. In a conventional method, a voice segment is mapped into a certain space through joint factor analysis to obtain an i-vector as the voiceprint. However, this method has the following two defects. First, a long voice segment (20 to 30 seconds) is required for extracting the i-vector, in order to acquire a satisfactory performance. Second, it is impossible or difficult to add other information of the speaker, such at the age, gender, and language of the speaker which facilitates identity verification, into the existing frame.

Therefore, it is desirable to provide a method and an apparatus for performing identity verification based on a voiceprint of a speaker which is short and contains various information of the speaker.

SUMMARY

Additional aspects and/or advantages will be set forth in part in the description which follows and, in part, will be apparent from the description, or may be learned by practice thereof.

In the following, an overview of the present disclosure is given simply to provide basic understanding to some aspects of the present disclosure. It should be understood that this overview is not an exhaustive overview of the present disclosure. It is neither intended to determine a critical part or an important part of the present disclosure, nor to limit the scope of the present disclosure. An object of the overview is only to give some concepts in a simplified manner, which serves as a preface of a more detailed description described later.

It is an object of the present disclosure to provide an identity verification method based on a voiceprint, which includes: receiving an unknown voice; extracting a voiceprint of the unknown voice using a neural network-based voiceprint extractor which is obtained through pre-training; concatenating the extracted voiceprint with a pre-stored voiceprint to acquire a concatenated voiceprint; and performing judgment on the concatenated voiceprint using a pre-trained classification model, to verify whether the extracted voiceprint and the pre-stored voiceprint are from a same person.

According to another aspect of the present disclosure, it is provided an identity verification apparatus based on a voiceprint, which includes: a voice reception unit configured to receive an unknown voice; a voiceprint extraction unit configured to extract a voiceprint of the unknown voice using a neural network-based voiceprint extractor which is obtained through pre-training; a voiceprint concatenation unit configured to concatenate the extracted voiceprint with a pre-stored voiceprint to obtain a concatenated voiceprint; and an identity verification unit configured to perform judgment on the concatenated voiceprint using a pre-trained classification model, to verify whether the extracted voiceprint and the pre-stored voiceprint are from a same person.

In addition, a computer program for implementing the above method is further provided according to the embodiments of the present disclosure.

Besides, a computer program product in at least a form of computer readable medium is further provided according to the embodiments of the present disclosure, where computer program codes for implementing the above method are recorded in the computer program product.

These and other advantages of the present disclosure may become more apparent by describing preferred embodiments of the present disclosure in detail in conjunction with the drawings below.

BRIEF DESCRIPTION OF THE DRAWINGS

The above and other objectives, features and advantages of the present disclosure can be understood more easily with reference to the description of the embodiments of the present disclosure in conjunction with the drawings below. The components in the drawings are only for illustrating the principle of the present disclosure. In the drawings, the same or similar technical features or components are represented with the same or similar reference numerals.

DETAILED DESCRIPTION

Figure 1:
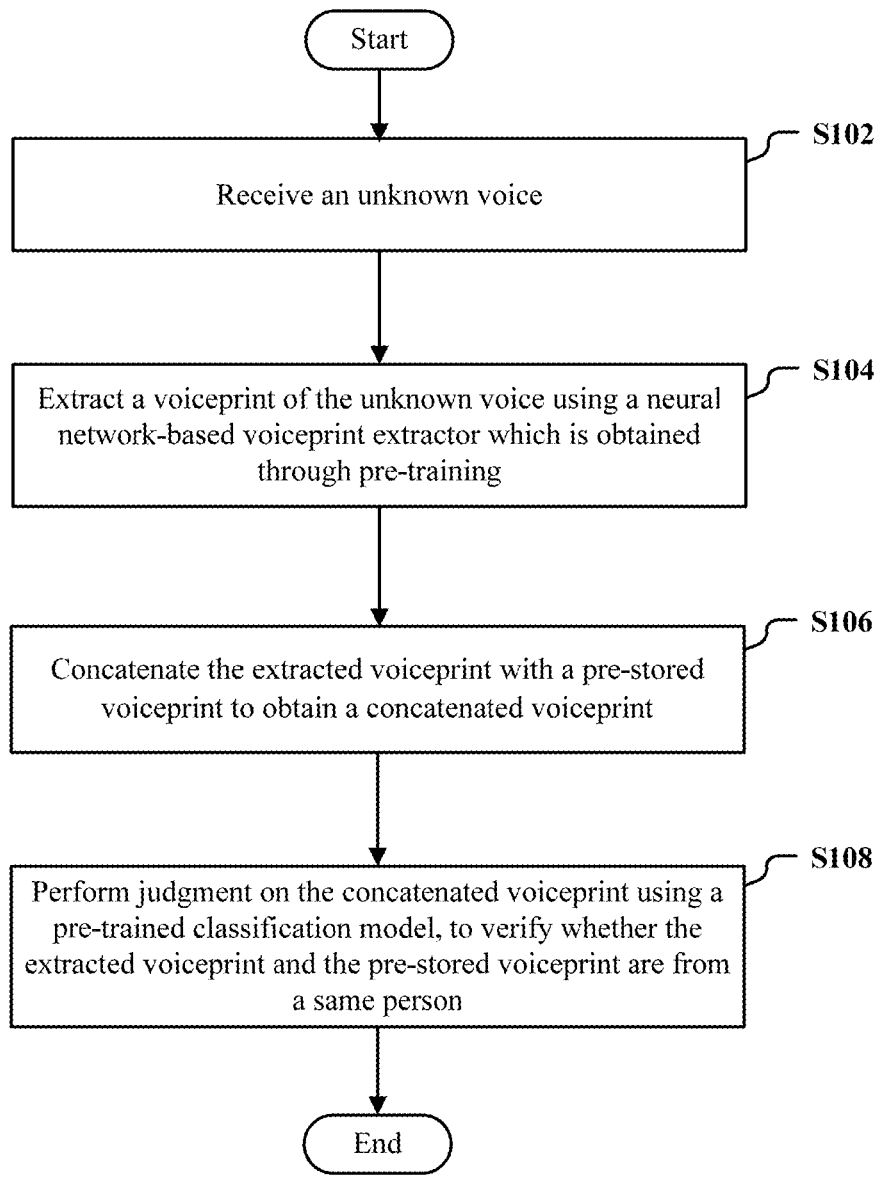
FIG. 1 illustrates a flow chart of an exemplary procedure of an identity verification method 100 based on a voiceprint according to an embodiment of the present disclosure.

Reference will now be made in detail to the embodiments, examples of which are illustrated in the accompanying drawings, wherein like reference numerals refer to the like elements throughout. The embodiments are described below to explain the present embodiments by referring to the figures.

An exemplary embodiment of the present disclosure will be described hereinafter in conjunction with the drawings.

For conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

An identity verification method based on a voiceprint is provided according to the present disclosure. With the identity verification method, the identity information of the speaker as well as other information including a voice channel, a phoneme sequence, gender, age, a language, a living area, emotion and the like of the speaker can be extracted from a short voice segment (for example, 3 to 5 seconds). The identity information in combination with other information including a voice channel, a phoneme sequence, gender, age, a language, a living area, emotion and the like of the speaker constitute a holographic voiceprint.

Hereinafter, an identity verification method based on a voiceprint and an identity verification apparatus based on a voiceprint according to the embodiments of the present disclosure are described in detail in conjunction with the drawings. The descriptions below are in the following order:
1. Identity verification method based on voiceprint;
2. Identity verification apparatus based on voiceprint; and
3. Computing device for implementing the method and the apparatus according to the present disclosure.

[1. Identity Verification Method Based on Voiceprint]

FIG. 1 illustrates a flow chart of an exemplary procedure of an identity verification method 100 based on a voiceprint according to an embodiment of the present disclosure.

First, in step S102, an unknown voice is received.

Then, in step S104, a voiceprint of the unknown voice is extracted using a neural network-based voiceprint extractor which is obtained through pre-training.

Figure 2:
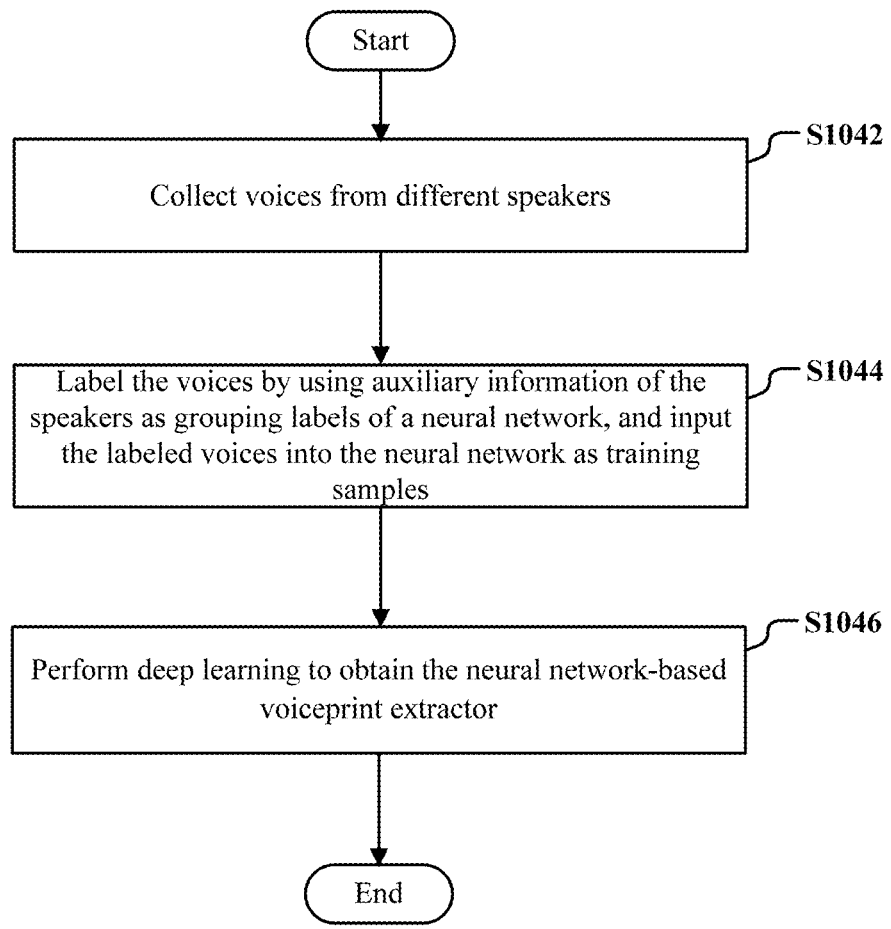
FIG. 2 illustrates a flow chart of an exemplary procedure of acquiring a neural network-based voiceprint extractor through training.

FIG. 2 illustrates a flow chart of an exemplary procedure of acquiring a neural network-based voiceprint extractor through training.

As shown in FIG. 2, in step S1042, voices from different speakers are collected.

Then, in step S1044, the voices are labeled by using auxiliary information of the speakers as grouping labels of a neural network, and the labeled voices are inputted into the neural network as training samples.

Specifically, a large amount of voices form different speakers are collected and labeled. The voices may include information of the identity (ID), the language, the phoneme sequence, the voice channel, the emotion, the age, the living area, and the gender of the speaker. In the present disclosure, the extracted voiceprint contains the above information such that the identity verification method according to the present disclosure is more robust. The labeled voices are inputted into the neural network as training samples.

The collected voice data is processed using the following method. The labeled voice data is segmented into signals with a frame length of 25 milliseconds and a frame shift of 10 milliseconds. 13 dimensional Mel-frequency cepstral coefficients (MFCCs) are extracted, and a total of 39 dimensional coefficients including the 13 dimensional Mel-frequency cepstral coefficients as well as the first order difference and the second order difference of the 13 dimensional Mel-frequency cepstral coefficients are used as the feature. The same processing is performed on 39 frames (including the current frame, 25 frames on the left side of the current frame and 13 frames on the right side of the frame) to obtain the final feature, which includes 1521 (39×39) dimensions.

It should be understood by those skilled in the art that, the voice data may be processed using other methods known in the art, which are not described herein.

The auxiliary information of the speakers includes one or more of: a language, a phoneme sequence, a voice channel, emotion, age, a living area, and gender of the speaker.

Finally, in step S1046, deep learning is performed to obtain the neural network-based voiceprint extractor.

Figure 3A:
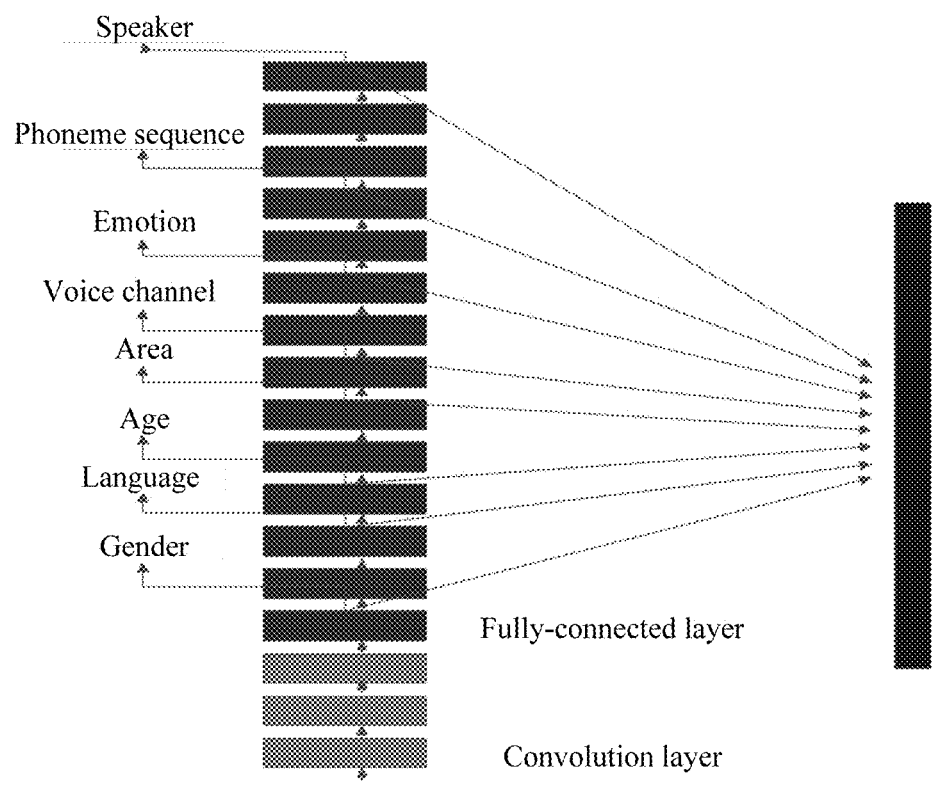
FIG. 3A illustrates a hierarchical neural network for extracting a voiceprint.
Figure 3B:
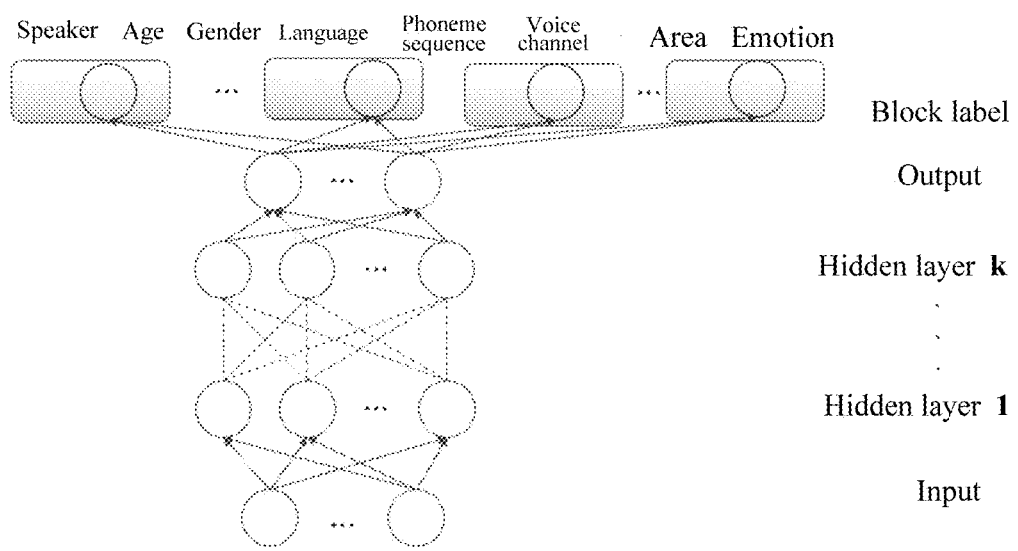
FIG. 3B illustrates a flat neural network for extracting a voiceprint.

In the present disclosure, two neural networks, including a hierarchical neural network and a flat neural network, are used to perform the deep learning. FIG. 3A illustrates a hierarchical neural network for extracting a voiceprint, and FIG. 3B illustrates a flat neural network for extracting a voiceprint. The two neural networks differ in positions at which grouping labels are placed. As shown in FIG. 3A, in the hierarchical neural network, different grouping labels are placed on different layers of the neural network for performing deep learning, so as to obtain the hierarchical network extractor for extracting a voiceprint. As shown in FIG. 3B, in the flat neural network, all grouping labels are placed on an output layer of the neural network for performing deep learning, so as to obtain the flat network extractor for extracting a voiceprint.

The 39×39 dimensional voice feature obtained in step S2042 is inputted into the two neural networks. Output neurons of the neural network are divided into several blocks, each of which is associated with one type of information of the speaker. For example, a first block is associated with an ID of the speaker, and a second block is associated with the age. The number of neurons in each block equals to the number of speakers, an age range, the number of genders, the number of languages, the number of types of text, the number of types of channels (mobile phone and landline telephone), the number of types of emotions, or the like. The outputted label is a one-hot vector, in which none-zero elements correspond to the identity, gender, age and the like of the speaker.

The extracting the voiceprint of the unknown voice using the neural network-based voiceprint extractor which is obtained through pre-training in step S104 includes: extracting voiceprints of the unknown voice using the hierarchical network extractor and the flat network extract respectively; and concatenating the voiceprint extracted using the hierarchical network extractor and the voiceprint extracted using the flat network extractor together as the extracted voiceprint of the unknown voice.

Preferably, in the hierarchical neural network, the grouping label is placed at a more preceding position in the neural network in a case that information contained in the grouping label is simpler.

For example, the number of neurons associated with the gender is 2, and the gender label is placed on a preceding layer of the hierarchical neural network. The numbers of neurons included in the blocks associated with the phoneme sequence and the emotion are greater, thus the phoneme sequence label and the emotion label are placed on posterior layers of the hierarchical neural network.

In an example, the deep learning is performed on the above two neural networks using a stochastic gradient descent method, in which a weight of the neural network is calculated using the following equation:

$$w_{t+1}=\theta_t+(a_t-1)(\theta_t-\theta_{t-1})/a_{t+1}+a_t(\theta_t-w_t)/a_{t+1}.$$

In the above equation, $w_t$ is a weight, $\theta_t = w_t - \epsilon_t \nabla f(w_t)$, $\epsilon_t$ is a learning rate, $\nabla f(w_t)$ is a gradient of a loss function f, $a_0=1$, and $a_{t+1}=(1+\sqrt{1+a_t^2})/2$.

Using the above equation to calculate weights of the neural network, a faster convergence of the stochastic gradient descent can be achieved.

Next, in step S106, the extracted voiceprint is concatenated with a pre-stored voiceprint to obtain a concatenated voiceprint.

In a device requiring identity verification, voiceprints of valid users of the device are pre-stored. When identity verification is performed, the voiceprint extracted from the unknown voice is concatenated with the pre-stored voiceprint, and the following judgment is performed.

Finally, in step S108, judgment is performed on the concatenated voiceprint using a pre-trained classification model, to verify whether the extracted voiceprint and the pre-stored voiceprint are from a same person.

Specifically, two Gaussian mixture model respectively corresponding to two cases are trained, where a first Gaussian mixture model corresponds to a case that the two voiceprints belong to a same person, and a second Gaussian mixture model corresponds to a case that the two voiceprints belong to different persons.

When the judgment is performed, a first probability of the concatenated voiceprint on the first Gaussian mixture model and a second probability of the concatenated voiceprint on the second Gaussian mixture model are calculated. It is determined that the extracted voiceprint and the pre-stored voiceprint are from a same person if the first probability is greater than the second probability. Otherwise, it is determined that the extracted voiceprint and the pre-stored voiceprint are from different persons.

In addition, whether the extracted voiceprint and the pre-stored voiceprint are from a same person may be judged using a judgment model. For example, a support vector machine or a neural network is used to construct a surface for distinguishing whether the voiceprints are from a same person.

The voiceprint extracted from the voice using the neural network-based voiceprint extractor obtained using the training method according to the present disclosure contains the auxiliary information of the speaker.

The present disclosure has the following advantages.

1) As compared with the conventional technology, the voiceprint of the speaker can be extracted from a short voice segment (for example 3 to 5 seconds).

2) Two neural networks for extracting the voiceprint (including the hierarchical neural network and the flat neural network) are designed, with which a holographic voiceprint of the speaker can be extracted, such that the identity verification method according to the present disclosure is more robust.

3) A new method for training the neural network is adopted, with which a faster convergence can be achieved.

4) Two voiceprint confirmation methods are disclosed.

2. Identity verification apparatus based on voiceprint

Figure 4:
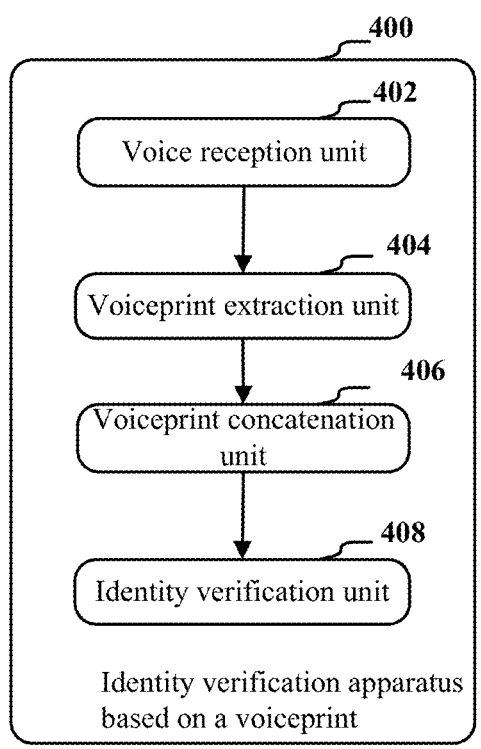
FIG. 4 is a block diagram illustrating an exemplary configuration of an identity verification apparatus 400 based on a voiceprint according to another embodiment of the present disclosure.

FIG. 4 is a block diagram illustrating an exemplary configuration of an identity verification apparatus 400 based on a voiceprint according to another embodiment of the present disclosure.

As shown in FIG. 4, the identity verification apparatus 400 based on a voiceprint includes a voice reception unit 402, a voiceprint extraction unit 404, a voiceprint concatenation unit 406 and an identity verification unit 408.

The voice reception unit 402 is configured to receive an unknown voice. The voiceprint extraction unit 404 is configured to extract a voiceprint of the unknown voice using a neural network-based voiceprint extractor which is obtained through training using a voiceprint extractor training apparatus. The voiceprint concatenation unit 406 is configured to concatenate the extracted voiceprint with a pre-stored voiceprint to obtain a concatenated voiceprint. The identity verification unit 408 is configured to perform judgment on the concatenated voiceprint using a pre-trained classification model, to verify whether the extracted voiceprint and the pre-stored voiceprint are from a same person.

Figure 5:
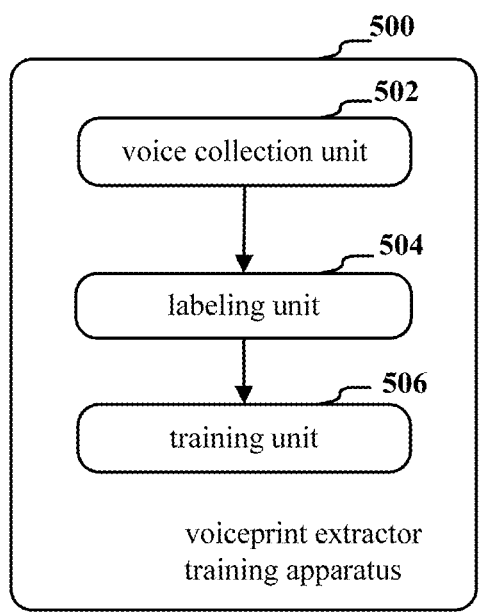
FIG. 5 is a block diagram illustrating an exemplary configuration of a voiceprint extractor training apparatus 500 for training a voiceprint extractor.

FIG. 5 is a block diagram illustrating an exemplary configuration of a voiceprint extractor training apparatus 500 for training a voiceprint extractor. As shown in FIG. 5, the voiceprint extractor training apparatus 500 includes a voice collection unit 502, a labeling unit 504 and a training unit 506.

The voice collection unit 502 is configured to collect voices from different speakers. The labeling unit 504 is configured to label the voices by using auxiliary information of the speakers as grouping labels of a neural network, and input the labeled voices into the neural network as training samples. The training unit 506 is configured to perform deep learning to obtain the neural network-based voiceprint extractor.

The auxiliary information of the speakers includes one or more of: a language, a phoneme sequence, a voice channel, emotion, age, a living area, and gender of the speaker.

The training unit is further configured to perform deep learning using a hierarchical neural network by placing different grouping labels on different layers of the hierarchical neural network respectively, to obtain a hierarchical network extractor; and perform deep learning using a flat neural network by placing all grouping labels on an output layer of the flat neural network, to obtain a flat network extractor.

The voiceprint extraction unit is further configured to extract voiceprints of the unknown voice using the hierarchical network extractor and the flat network extractor respectively; and concatenate the voiceprint extracted using the hierarchical network extractor and the voiceprint extracted using the flat network extractor together as the extracted voiceprint of the unknown voice.

The grouping label is placed at a more preceding position in the hierarchical neural network in a case that information contained in the grouping label is simpler.

The deep learning may be performed using a stochastic gradient descent method, in which a weight of the neural network is calculated using the following equation:

$$w_{t+1}=\theta_t+(a_t-1)(\theta_t-\theta_{t-1})/a_{t+1}+a_t(\theta_t-w_t)/a_{t+1}.$$

In the above equation, $w_t$ is a weight, $\theta_t = w_t - \epsilon_t \nabla f(w_t)$, $\epsilon_t$ is a learning rate, $\nabla f(w_t)$ is a gradient of a loss function f, $a_0=1$, and $a_{t+1}=(1+\sqrt{1+a_t^2})/2$.

The identity verification unit is further configured to train a first Gaussian mixture model and a second Gaussian mixture model, where the first Gaussian mixture model corresponds to a case that the two voiceprints belong to a same person, and the second Gaussian mixture model corresponds to a case that the two voiceprints belong to different persons; calculate a first probability of the concatenated voiceprint on the first Gaussian mixture model and a second probability of the concatenated voiceprint on the second Gaussian mixture model; and determine the extracted voiceprint and the pre-stored voiceprint to be from a same person if the first probability is greater than the second probability, and determine the extracted voiceprint and the pre-stored voiceprint to be from different persons if the first probability is not greater than the second probability.

The extracted voiceprint of the unknown voice contains the auxiliary information of the speaker.

One refer to the embodiment of the identity verification method based on a voiceprint described in conjunction with FIGS. 1 to 3 for detailed descriptions of the operations and functions of various components of the identity verification apparatus 400 based on a voiceprint and the voiceprint extractor training apparatus 500, which are not described herein.

It should be noted that, structures of the identity verification apparatus 400 based on a voiceprint and the voiceprint extractor training apparatus 500 and components of the identity verification apparatus 400 based on a voiceprint and the voiceprint extractor training apparatus 500 shown in FIG. 4 and FIG. 5 are only exemplary, and the block diagrams illustrating the structures shown in FIG. 4 and FIG. 5 can be modified by those skilled in the art as needed.

An identity verification method based on a voiceprint and an identity verification apparatus based on a voiceprint are provided according to the present disclosure, with which a holographic voiceprint of the speaker can be extracted from a short voice segment (for example 3 to 5 seconds), so that the identity verification method according to the present disclosure is more robust.

[3. Computing Device for Implementing the Method and the Apparatus According to the Present Disclosure]

The basic principles of the present disclosure have been described above in conjunction with specific embodiments. However, it should be noted that, it can be understood by those skilled in the art that all or any of the steps or components of the methods and the apparatuses according to the present disclosure may be implemented in forms of hardware, firmware, software, or a combination thereof, in any computing device (including a processor, a memory medium and the like) or in a network of computing device, which can be implemented by those skilled in the art by means of basic programming skills upon reading the description of the present disclosure.

Therefore, the object of the present disclosure may be also implemented by running a program or a group of programs on any computing device. The computing device may be a known general device. In this case, the object of the present disclosure may be also implemented by only providing a program product containing program codes for implementing the method and the apparatus. That is to say, the present disclosure may be also constructed by such program product, and may be also constructed by a storage medium in which such program product is stored. Apparently, the storage medium may be any known storage medium or any storage medium to be developed in the future.

Figure 6:
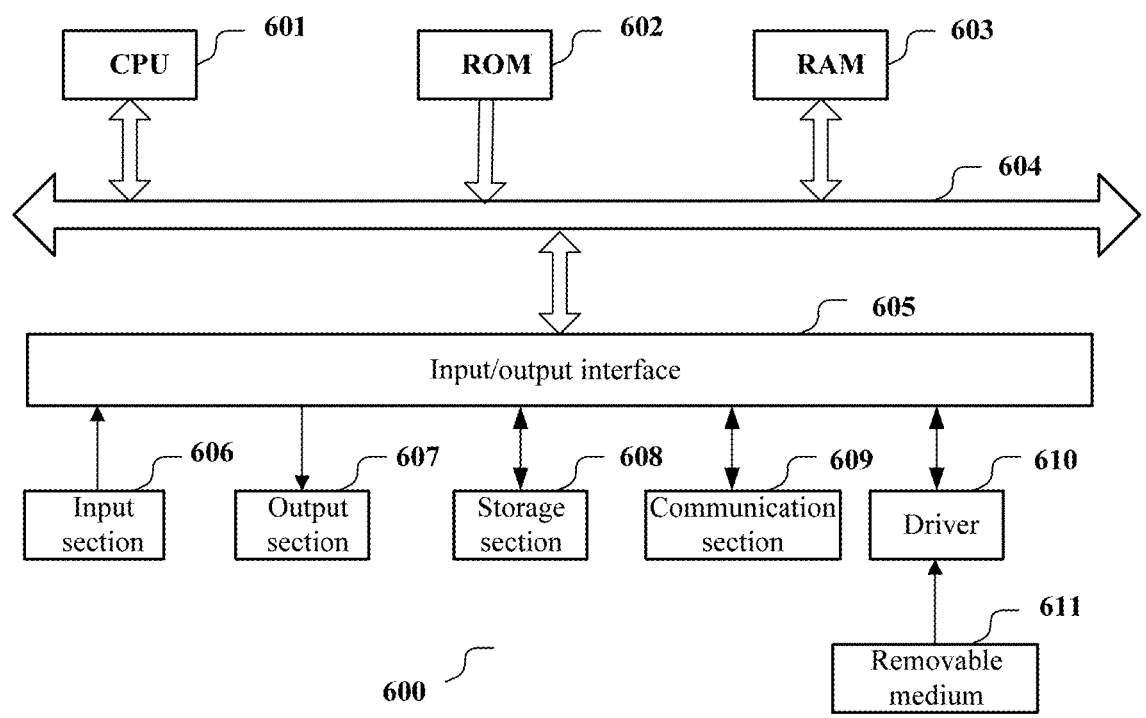
FIG. 6 is a schematic diagram illustrating an exemplary structure of a computing device for implementing the identity verification method based on a voiceprint and the identity verification apparatus based on a voiceprint according to the present disclosure.

In the case where the present disclosure is realized by software and/or firmware, a program constituting the software is installed in a computer with a dedicated hardware structure such as the general computer 600 shown in FIG. 6 from a storage medium or network. The computer is capable of implementing various functions when installed with various programs.

In FIG. 6, a central processing unit (CPU) 601 executes various processing according to a program stored in a read-only memory (ROM) 602 or a program loaded to a random access memory (RAM) 603 from a memory section 608. The data needed for the various processing of the CPU 601 may be stored in the RAM 603 as needed. The CPU 601, the ROM 602 and the RAM 603 are linked with each other via a bus 604. An input/output interface 605 is also linked to the bus 604.

The following components are linked to the input/output interface 605: an input section 606 (including keyboard, mouse and the like), an output section 607 (including displays such as a cathode ray tube (CRT), a liquid crystal display (LCD), a loudspeaker and the like), a memory section 608 (including hard disc and the like), and a communication section 609 (including a network interface card such as a LAN card, a modem and the like). The communication section 609 performs communication processing via a network such as the Internet. A driver 610 may also be linked to the input/output interface 605, if needed. If needed, a removable medium 611 such as a magnetic disc, an optical disc, a magnetic optical disc and a semiconductor memory may be installed in the driver 610, so that the computer program read therefrom is installed in the memory section 608 as appropriate.

In the case where the foregoing series of processing is achieved with software, programs constituting the software are installed from a network such as the Internet or a storage medium such as the removable medium 611.

It should be appreciated by those skilled in the art that the memory medium is not limited to the removable medium 611 shown in FIG. 6, which has program stored therein and is distributed separately from the apparatus so as to provide the programs to users. The removable medium 611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 602 and the memory section 608 in which programs are stored, and can be distributed to users along with the device in which they are incorporated.

A program product storing machine readable instruction codes is further provided according to the present disclosure. The instruction codes can perform the method according to the embodiments of the present disclosure when being read and executed by a machine.

Accordingly, a storage medium for carrying the program product in which machine-readable instruction codes are stored is also covered in the present disclosure. The storage medium includes but is not limited to floppy, optical disc, magnetic optical disc, memory card, memory stick and the like.

It should be understood by those skilled in the art that, what are listed herein are exemplary, and the present disclosure is not limited thereto.

In the specification, representations such as "first", "second" and "n-th" are used for distinguishing the described features literally, to clearly describe the present disclosure and should not be construed as limiting.

As an example, the steps of the above method and the modules and/or units of the above device may be implemented by software, firmware, hardware or a combination thereof, and serve as a portion of an apparatus. In the case that the modules and/or units of the above device are configured by software, firmware, hardware or a combination thereof, an available means or approach may be well known by those skilled in the art and is not described hereinafter.

As an example, in the case where the present disclosure is realized by software or firmware, a program constituting the software is installed in a computer with a dedicated hardware structure (such as the general computer 600 shown in FIG. 6) from a storage medium or network. The computer is capable of implementing various functions when installed with various programs.

In the above description of the embodiments of the present disclosure, features that are described and/or illustrated with respect to one embodiment may be used in the same way or in a similar way in one or more other embodiments, in combination with or instead of the features of the other embodiments.

It should be emphasized that the term "comprising/including" when used in this specification is taken to specify the presence of features, elements, steps or components, but does not preclude the presence or addition of one or more other features, elements, steps or components.

In addition, the method according to the present disclosure are not limited to be executed in the time sequencing described in the specification, and may be executed sequentially, in parallel or independently. Therefore, the execution order of the method described in the specification is not intended to limit the technical scope of the present disclosure.

The present disclosure and its advantages are described in the above. However, it should be understood that, various changes, replacements and transformations can be made to the present disclosure without departing from the spirit and scope defined by the appended claims. In addition, the present disclosure is not limited to the processes, devices, means, methods and steps in the embodiments described in the specification. It is easily understood by those skilled in the art from the present disclosure that, existing processes, devices, means, methods or steps and processes, devices, means, methods or steps to be developed in the future, which have the substantially same functions as the embodiments herein or can achieve a substantially same result as the embodiments herein may be used or performed according to the present disclosure. Therefore, the appended claims are intended to include these processes, devices, means, methods or steps within the scope thereof.

As can be seen from the above description, at least the following technical solutions are disclosed according to the present disclosure:

1. An identity verification method based on a voiceprint, comprising:
  receiving an unknown voice;
  extracting a voiceprint of the unknown voice using a neural network-based voiceprint extractor which is obtained through pre-training;
  concatenating the extracted voiceprint with a pre-stored voiceprint to acquire a concatenated voiceprint; and
  performing judgment on the concatenated voiceprint using a pre-trained classification model, to verify whether the extracted voiceprint and the pre-stored voiceprint are from a same person.

2. The identity verification method according to Appendix 1, where the neural network-based voiceprint extractor is obtained through training by:
  collecting voices from different speakers;
  labeling the voices by using auxiliary information of the speakers as grouping labels of a neural network, and inputting the labeled voices into the neural network as training samples; and
  performing deep learning to obtain the neural network-based voiceprint extractor.

3. The identity verification method according to Appendix 2, where the auxiliary information of the speakers comprises one or more of: a language, a phoneme sequence, a voice channel, emotion, age, a living area, and gender of the speaker.

4. The identity verification method according to Appendix 2, where the performing deep learning to obtain the neural network-based voiceprint extractor comprises:
  performing deep learning using a hierarchical neural network by placing different grouping labels on different layers of the hierarchical neural network respectively, to obtain a hierarchical network extractor; and
  performing deep learning using a flat neural network by placing all grouping labels on an output layer of the flat neural network, to obtain a flat network extractor.

5. The identity verification method according to Appendix 4, where the extracting the voiceprint of the unknown voice using the neural network-based voiceprint extractor which is obtained through pre-training comprises:
  extracting voiceprints of the unknown voice using the hierarchical network extractor and the flat network extract respectively; and
  concatenating the voiceprint extracted using the hierarchical network extractor and the voiceprint extracted using the flat network extractor together as the extracted voiceprint of the unknown voice.

6. The identity verification method according to Appendix 4, where the grouping label is placed at a more preceding position in the hierarchical neural network in a case that information contained in the grouping label is simpler.

7. The identity verification method according to Appendix 2, where the deep learning is performed using a stochastic gradient descent method, in which a weight of the neural network is calculated using the following equation:

$$w_{t+1} = \theta_t + (a_t - 1)(\theta_t - \theta_{t-1})/a_{t+1} + a_t(\theta_t - w_t)/a_{t+1},$$

where wt is a weight, $\theta_t = w_t - \epsilon_t \nabla f(w_t)$, $\epsilon_t$ is a learning rate, $\nabla f(w_t)$ is a gradient of a loss function f, a0=1, and $a_{t+1} = (1 + \sqrt{1 + a_t^2})/2$.

8. The identity verification method according to Appendix 1, where the performing judgment on the concatenated voiceprint using the pre-trained classification model, to verify whether the extracted voiceprint and the pre-stored voiceprint are from a same person comprises:
  training a first Gaussian mixture model and a second Gaussian mixture model, where the first Gaussian mixture model corresponds to a case that two voiceprints belong to a same person, and the second Gaussian mixture model corresponds to a case that the two voiceprints belong to different persons;
  calculating a first probability of the concatenated voiceprint on the first Gaussian mixture model and a second probability of the concatenated voiceprint on the second Gaussian mixture model; and
  determining the extracted voiceprint and the pre-stored voiceprint to be from a same person if the first probability is greater than the second probability, and determine the extracted voiceprint and the pre-stored voiceprint to be from different persons if the first probability is not greater than the second probability.

9. The identity verification method according to Appendix 2, where the extracted voiceprint of the unknown voice contains the auxiliary information of the speaker.

10. An identity verification apparatus based on a voiceprint, comprising:
a voice reception unit configured to receive an unknown voice;
a voiceprint extraction unit configured to extract a voiceprint of the unknown voice using a neural network-based voiceprint extractor which is obtained through training using a voiceprint extractor training apparatus;
a voiceprint concatenation unit configured to concatenate the extracted voiceprint with a pre-stored voiceprint to obtain a concatenated voiceprint; and
an identity verification unit configured to perform judgment on the concatenated voiceprint using a pre-trained classification model, to verify whether the extracted voiceprint and the pre-stored voiceprint are from a same person.

11. The identity verification apparatus according to Appendix 10, where the voiceprint extractor training apparatus comprises:
a voice collection unit configured to collect voices from different speakers;
a labeling unit configured to label the voices by using auxiliary information of the speakers as grouping labels of a neural network, and input the labeled voices into the neural network as training samples; and
a training unit configured to perform deep learning to obtain the neural network-based voiceprint extractor.

12. The identity verification apparatus according to Appendix 11, where the auxiliary information of the speakers comprises one or more of: a language, a phoneme sequence, a voice channel, emotion, age, a living area, and gender of the speaker.

13. The identity verification apparatus according to Appendix 11, where the training unit is further configured to:
perform deep learning using a hierarchical neural network by placing different grouping labels on different layers of the hierarchical neural network respectively, to obtain a hierarchical network extractor; and perform deep learning using a flat neural network by placing all grouping labels on an output layer of the flat neural network, to obtain a flat network extractor.

14. The identity verification apparatus according to Appendix 13, where voiceprint extraction unit is further configured to:
extract voiceprints of the unknown voice using the hierarchical network extractor and the flat network extract respectively; and
concatenate the voiceprint extracted using the hierarchical network extractor and the voiceprint extracted using the flat network extractor together as the extracted voiceprint of the unknown voice.

15. The identity verification apparatus according to Appendix 13, where the grouping label is placed at a more preceding position in the hierarchical neural network in a case that information contained in the grouping label is simpler.

16. The identity verification apparatus according to Appendix 11, where the deep learning is performed using a stochastic gradient descent method, in which a weight of the neural network is calculated using the following equation:

$$w_{t+1} = \theta_t + (a_t - 1)(\theta_t - \theta_{t-1})/a_{t+1} + a_t(\theta_t - w_t)/a_{t+1},$$

where $w_t$ is a weight, $\theta_t = w_t - \epsilon_t \nabla f(w_t)$, $\epsilon_t$ is a learning rate, $\nabla f(w_t)$ is a gradient of a loss function f, $a_0 = 1$, and $a_{t+1} = (1 + \sqrt{1 + a_t^2})/2$.

17. The identity verification apparatus according to Appendix 10, where identity verification unit is further configured to:
train a first Gaussian mixture model and a second Gaussian mixture model, where the first Gaussian mixture model corresponds to a case that two voiceprints belong to a same person, and the second Gaussian mixture model corresponds to a case that the two voiceprints belong to different persons;
calculate a first probability of the concatenated voiceprint on the first Gaussian mixture model and a second probability of the concatenated voiceprint on the second Gaussian mixture model; and
determine the extracted voiceprint and the pre-stored voiceprint to be from a same person if the first probability is greater than the second probability, and determine the extracted voiceprint and the pre-stored voiceprint to be from different persons if the first probability is not greater than the second probability.

18. The identity verification apparatus according to Appendix 11, where the extracted voiceprint of the unknown voice contains the auxiliary information of the speaker.

What is claimed is:

1. An identity verification method based on a voiceprint, comprising:
receiving an unknown voice;
extracting the voiceprint of the unknown voice using a neural network-based voiceprint extractor which is obtained through pre-training;
concatenating the extracted voiceprint with a pre-stored voiceprint to obtain a concatenated voiceprint; and
performing judgment on the concatenated voiceprint using a pre-trained classification model, to verify whether the extracted voiceprint and the pre-stored voiceprint are from a same person.

2. The identity verification method according to claim 1, wherein the neural network-based voiceprint extractor is obtained through training by:
collecting voices from different speakers;
labeling the voices by using auxiliary information of the speakers as grouping labels of the neural network, and inputting labeled voices into the neural network as training samples; and
performing deep learning to obtain the neural network-based voiceprint extractor.

3. The identity verification method according to claim 2, wherein the auxiliary information of the speakers comprises one or more of: a language, a phoneme sequence, a voice channel, emotion, age, a living area, and gender of a speaker.

4. The identity verification method according to claim 2, wherein the performing deep learning to obtain the neural network-based voiceprint extractor comprises:
performing the deep learning using a hierarchical neural network by placing different grouping labels on different layers of the hierarchical neural network respectively, to obtain a hierarchical network extractor; and
performing the deep learning using a flat neural network by placing all grouping labels on an output layer of the flat neural network, to obtain a flat network extractor.

5. The identity verification method according to claim 4, wherein the extracting the voiceprint of the unknown voice using the neural network-based voiceprint extractor which is obtained through pre-training comprises:
extracting voiceprints of the unknown voice using the hierarchical network extractor and the flat network extract respectively; and
concatenating the voiceprint extracted using the hierarchical network extractor and the voiceprint extracted using the flat network extractor together as the extracted voiceprint of the unknown voice.

6. The identity verification method according to claim 4, wherein a grouping label is placed at a more preceding position in the hierarchical neural network when information contained in the grouping label is simpler.

7. The identity verification method according to claim 2, wherein the deep learning is performed using a stochastic gradient descent method, wherein a weight of the neural network is calculated using:

$$w_{t+1}=\theta_t+(a_t-1)(\theta_t-\theta_{t-1})/a_{t+1}+a_t(\theta_t-w_t)/a_{t+1},$$

wherein $w_t$ is a weight, $\theta_t=w_t-\epsilon_t\nabla f(w_t)$, $\epsilon_t$ is a learning rate, $\nabla f(w_t)$ is a gradient of a loss function f, $a_0=1$, and $a_{t+1}=(1+\sqrt{1+a_t^2})/2$.

8. The identity verification method according to claim 2, wherein the extracted voiceprint of the unknown voice contains the auxiliary information of the speaker.

9. The identity verification method according to claim 1, wherein the performing judgment on the concatenated voiceprint using the pre-trained classification model, to verify whether the extracted voiceprint and the pre-stored voiceprint are from the same person comprises:
training a first Gaussian mixture model and a second Gaussian mixture model, wherein the first Gaussian mixture model corresponds to a case where two voiceprints belong to the same person, and the second Gaussian mixture model corresponds to the case that the two voiceprints belong to different persons;
calculating a first probability of the concatenated voiceprint on the first Gaussian mixture model and a second probability of the concatenated voiceprint on the second Gaussian mixture model; and
determining the extracted voiceprint and the pre-stored voiceprint to be from the same person when the first probability is greater than the second probability, and determining the extracted voiceprint and the pre-stored voiceprint to be from the different persons when the first probability is not greater than the second probability.

10. An identity verification apparatus based on a voiceprint, comprising:
a memory; and
a processor coupled to the memory, where the processor is configured to:
receive an unknown voice;
extract the voiceprint of the unknown voice using a neural network-based voiceprint extractor which is obtained through pre-training;
concatenate the extracted voiceprint with a pre-stored voiceprint to obtain a concatenated voiceprint; and
perform judgment on the concatenated voiceprint using a pre-trained classification model, to verify whether the extracted voiceprint and the pre-stored voiceprint are from a same person.

11. The identity verification apparatus according to claim 10, wherein the pre-training comprises:
collecting voices from different speakers;
labeling the voices by using auxiliary information of the speakers as grouping labels of the neural network, and inputting labeled voices into the neural network as training samples; and
performing deep learning to perform training so as to obtain the neural network-based voiceprint extractor.

12. The identity verification apparatus according to claim 11, wherein the auxiliary information of the speakers comprises one or more of: a language, a phoneme sequence, a voice channel, emotion, age, a living area, and gender of the speaker.

13. The identity verification apparatus according to claim 11, wherein the training comprises:
performing the deep learning using a hierarchical neural network by placing different grouping labels on different layers of the hierarchical neural network respectively, to obtain a hierarchical network extractor; and
performing the deep learning using a flat neural network by placing all grouping labels on an output layer of the flat neural network, to obtain a flat network extractor.

14. The identity verification apparatus according to claim 13, wherein the processor is configured to extract the voiceprint of the unknown voice by:
extracting voiceprints of the unknown voice using the hierarchical network extractor and the flat network extract respectively; and
concatenating the voiceprint extracted using the hierarchical network extractor and the voiceprint extracted using the flat network extractor together as the extracted voiceprint of the unknown voice.

15. The identity verification apparatus according to claim 13, wherein a grouping label is placed at a more preceding position in the hierarchical neural network when information contained in the grouping label is simpler.

16. The identity verification apparatus according to claim 11, wherein the deep learning is performed using a stochastic gradient descent method, in which a weight of the neural network is calculated using:

$$w_{t+1}=\theta_t+(a_t-1)(\theta_t-\theta_{t-1})/a_{t+1}+a_t(\theta_t-w_t)/a_{t+1},$$

wherein $w_t$ is a weight, $\theta_t=w_t-\epsilon_t\nabla f(w_t)$, $\epsilon_t$ is a learning rate, $\nabla f(w_t)$ is a gradient of a loss function f, $a_0=1$, and $a_{t+1}=(1+\sqrt{1+a_t^2})/2$.

17. The identity verification apparatus according to claim 11, wherein the extracted voiceprint of the unknown voice contains the auxiliary information of a speaker.

18. The identity verification apparatus according to claim 10, wherein the processor is configured to verify by:
training a first Gaussian mixture model and a second Gaussian mixture model, wherein the first Gaussian mixture model corresponds to a case that two voiceprints belong to a same person, and the second Gaussian mixture model corresponds to the case that the two voiceprints belong to different persons;
calculating a first probability of the concatenated voiceprint on the first Gaussian mixture model and a second probability of the concatenated voiceprint on the second Gaussian mixture model; and
determining the extracted voiceprint and the pre-stored voiceprint to be from the same person when the first probability is greater than the second probability, and determining the extracted voiceprint and the pre-stored voiceprint to be from the different persons when the first probability is not greater than the second probability.

19. A non-transitory computer readable storage medium storing a program which, when being executed by a computer, causes the computer to implement the identity verification method according to claim 1.

* * * * *